United States Patent
Nodera et al.

[11] Patent Number: 5,837,757
[45] Date of Patent: Nov. 17, 1998

[54] FLAME-RETARDANT POLYCARBONATE COMPOSITIONS

[75] Inventors: Akio Nodera; Hiroshi Itagaki, both of Ichihara, Japan

[73] Assignee: Idemitsu Petrochemical Co., Ltd., Tokyo, Japan

[21] Appl. No.: 868,150

[22] Filed: Jun. 3, 1997

[30] Foreign Application Priority Data

Jun. 18, 1996 [JP] Japan ................................. 8-156536
Jul. 25, 1996 [JP] Japan ................................. 8-195937

[51] Int. Cl.$^6$ ................................................. C08K 5/353
[52] U.S. Cl. ........................ 524/87; 524/94; 524/141; 524/143; 524/413; 524/497
[58] Field of Search ................................. 524/413, 497, 524/87, 94, 141, 143

[56] References Cited

U.S. PATENT DOCUMENTS

| | | | |
|---|---|---|---|
| 3,351,591 | 11/1967 | Siegrist et al. | 524/87 |
| 3,523,810 | 8/1970 | Swank | 524/497 |
| 3,554,777 | 1/1971 | Lederer et al. | 524/497 |
| 3,901,844 | 8/1975 | Schiller et al. | 529/497 |
| 3,907,581 | 9/1975 | Wilcox | 524/497 |
| 4,377,417 | 3/1983 | Brand | 524/497 |
| 4,877,819 | 10/1989 | Kiyohara et al. | 524/497 |
| 5,204,394 | 4/1993 | Gosens et al. | 524/127 |
| 5,240,978 | 8/1993 | Fuhr et al. | 524/141 |
| 5,389,714 | 2/1995 | Ohtomo et al. | 524/497 |
| 5,391,600 | 2/1995 | Umeda et al. | 524/588 |
| 5,534,584 | 7/1996 | Kitamura et al. | 524/497 |
| 5,650,455 | 7/1997 | Atkins et al. | 524/94 |

*Primary Examiner*—Veronica P. Hoke
*Attorney, Agent, or Firm*—Oblon, Spivak, McClelland, Maier & Neustadt, P.C.

[57] ABSTRACT

Disclosed are non-bromine, flame-retardant polycarbonate resin compositions having increased reflectance and improved light shieldability, light fastness and moldability while still having good mechanical properties such as flame retardancy and impact resistance, and light reflectors as produced by molding the compositions. One type of the composition comprises (A) a polycarbonate resin and (B) a titanium oxide powder in a ratio by weight of from 70/30 to 90/10, and contains (C) a stilbene-bisbenzoxazole derivative in an amount of from 1 to 1000 ppm by weight and optionally (D) a non-halogen phosphate compound in an amount of from 0.05 to 1.00% by weight in term of phosphorus element, relative to the total weight of the component (A) and the component (B). The other type of the composition comprises (A) from 99.9 to 70% by weight of a polycarbonate resin and (B) from 0.1 to 30% by weight of a titanium oxide powder, and contains (D) a non-halogen phosphate compound in an amount of from 0.05 to 1.00 part by weight in term of phosphorus element, relative to 100 parts by weight of the sum of the component (A) and the component (B).

17 Claims, No Drawings

FLAME-RETARDANT POLYCARBONATE COMPOSITIONS

FIELD OF THE INVENTION

The present invention relates to flame-retardant polycarbonate resin compositions and light reflectors comprising them. More precisely, it relates to non-bromine, flame-retardant polycarbonate resin compositions having increased reflectance and improved light shieldability, light fastness and moldability while still having good mechanical properties such as flame retardancy and impact resistance, and also to light reflectors suitable to liquid crystal display backlight to be produced by molding the compositions.

BACKGROUND OF THE INVENTION

As having excellent mechanical properties (especially, impact resistance), electric characteristics and transparency, polycarbonate resins are widely used as engineering plastics in various fields of OA (Office Automation) appliances, electric and electronic appliances and constructions. In such fields, those for liquid crystal display backlight reflectors are required to have high reflectance.

Of various thermoplastic resins, polycarbonate resins have a high oxygen index and are generally self-extinguishable. However, in order to safely use them in various fields of OA appliances, electric and electronic appliances and others, greatly needed are resin compositions with further improved flame retardancy.

On the other hand, in view of recent environmental problems, non-bromine flame retardants are desired. In addition, for use in liquid display backlight reflectors, resins are required to have high reflectance as well as high light shieldability and light fastness, as so mentioned hereinabove. Moreover, for televisions, personal computers and other appliances comprising liquid crystal displays, the recent tendency is toward slim and thin products. For these, therefore, needed are materials with good moldability.

In this situation, desired are non-bromine, flame-retardant polycarbonate resin compositions having increased reflectance and improved light shieldability, light fastness and moldability while still having good mechanical properties such as flame retardancy and impact resistance.

Polycarbonate resin compositions with increased reflectance are known, which comprises polycarbonate resins and titanium oxide (see, for example, Japanese Patent Publication No. 63-26140). However, the conventional, titanium oxide-containing materials have poor light shieldability and are problematic in that they transmit light, inevitably resulting in the decrease in the degree of luminance. In addition, as having poor light fastness and poor moldability, they are further problematic in that they are often yellowed while being in molds during molding and that the molded articles often have silver marks. On the other hand, no prior art technique is disclosed for adding phosphorus-containing flame retardants to polycarbonate resins to make the resins resistant to flames. This is probably because such flame retardant-containing resins are difficult to mold. Polycarbonate resin compositions containing a white pigment of titanium oxide are disclosed, for example, in Japanese Patent Publication No. 63-26140, Japanese Patent Application Laid-Open No. 6-200140 and U.S. Pat. No. 5,391,600, none of which, however, refer to the use of these compositions in reflectors.

SUMMARY OF THE INVENTION

Given the situation, the present invention is to provide non-bromine, flame-retardant polycarbonate resin compositions having increased reflectance and improved light shieldability, light fastness and moldability while still having good mechanical properties such as flame retardancy and impact resistance, and also flame-retardant light reflectors with excellent light-reflecting characteristics to be produced from the compositions.

We, the present inventors have assiduously studied so as to attain the above-mentioned object and, as a result, have found that polycarbonate resin compositions comprising a titanium oxide-containing polycarbonate resin and a specific lightness improver, or a specific lightness improver and a non-halogen phosphate compound and optionally a specific organopolysiloxane and/or polytetrafluoroethylene, in a predetermined ratio, and also light reflectors to be produced by molding the resin compositions meet the object. Accordingly, the first aspect of the present invention is to provide these polycarbonate resin compositions and light reflectors. Specifically, the first aspect of the invention includes the following:

(1) A flame-retardant polycarbonate resin composition comprising (A) a polycarbonate resin and (B) a titanium oxide powder in a ratio by weight of from 70/30 to 90/10, and containing (C) a stilbene-bisbenzoxazole derivative in an amount of from 1 to 1000 ppm by weight relative to the total weight of the component (A) and the component (B).

(2) A flame-retardant polycarbonate resin composition comprising (A) a polycarbonate resin and (B) a titanium oxide powder in a ratio by weight of from 70/30 to 90/10, and containing (C) a stilbene-bisbenzoxazole derivative in an amount of from 1 to 1000 ppm by weight and (D) a non-halogen phosphate compound in an amount of from 0.05 to 1.00% by weight in term of phosphorus element, relative to the total weight of the component (A) and the component (B).

(3) A flame-retardant polycarbonate resin composition of the above-mentioned (1) or (2), which further contains (E) an alkoxy group-having organopolysiloxane in an amount of from 0.01 to 5% by weight and/or (F) a fibril-forming polytetrafluoroethylene in an amount of from 0.01 to 1% by weight, relative to the total weight of the component (A) and the component (B).

(4) The flame-retardant polycarbonate resin composition of the above-mentioned (3), in which the component (E), alkoxy group-having organopolysiloxane is an organopolysiloxane having an organoxy-silyl group as bonded to the silicon atom via a divalent hydrocarbon group.

(5) The flame-retardant polycarbonate resin composition of the above-mentioned from (1) to (4), which further contains (F) a fibril-forming polytetrafluoroethylene in an amount of from 0.01 to 1% by weight relative to the total weight of the component (A) and the component (B).

(6) A light reflector as produced by molding the flame-retardant polycarbonate resin composition of any one of the above-mentioned from (1) to (5).

(7) The light reflector as above-mentioned (6), which is for liquid crystal display backlight.

In addition, we, the present inventors have further studied in order to solve the above-mentioned problems and, as a result, have found that the addition of titanium oxide and a non-halogen phosphate compound to polycarbonate resins, while specifically defining their amounts to be added and also the phosphorus content of the phosphate compound, can solve the problems. Based on these findings, we have completed the present invention. This addition is the second aspect of the present invention. Specifically, the second aspect of the invention includes the following:

(8) A flame-retardant polycarbonate resin composition comprising (A) from 99.9 to 70% by weight of a polycarbonate resin and (B) from 0.1 to 30% by weight of a titanium oxide powder, and containing (D) a non-halogen phosphate compound in an amount of from 0.05 to 1.00 part by weight in term of phosphorus element, relative to 100 parts by weight of the sum of the component (A) and the component (B).

(9) A flame-retardant polycarbonate resin composition of the above-mentioned (8), which further contains (E) an alkoxy group-having organopolysiloxane in an amount of from 0.01 to 2 parts by weight relative to 100 parts by weight of the sum of the component (A) and the component (B).

(10) A flame-retardant polycarbonate resin composition of the above-mentioned (9), in which the alkoxy group-having organopolysiloxane is an organopolysiloxane having an organoxy-silyl group as bonded to the silicon atom via a divalent hydrocarbon group.

(11) A flame-retardant polycarbonate resin composition of any of the above-mentioned (8), (9) or (10), which further contains (F) a fibril-forming polytetrafluoroethylene in an amount of from 0.01 to 1 part by weight, relative to 100 parts by weight of the sum of the component (A) and the component (B).

(12) A light reflector as produced by molding the flame-retardant polycarbonate resin composition of any of the above-mentioned (8), (9), (10) or (11).

(13) A reflector for liquid crystal backlight, as produced by molding the flame-retardant polycarbonate resin composition of any of the above-mentioned (8), (9), (10) or (11).

DESCRIPTION THE PREFERRED EMBODIMENT OF THE INVENTION

The polycarbonate resin to be in the flame-retardant polycarbonate resin compositions of the present invention as the component (A) includes various types of resins. Preferred are polymers having repeating units with a structure of a general formula (I):

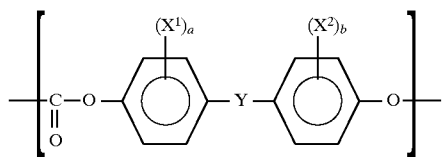

In formula (I), $X^1$ and $X^2$ each represent a linear, branched or cyclic alkyl group having from 1 to 6 carbon atoms. Concretely, the alkyl group may include, for example, a methyl group, an ethyl group, an n-propyl group, an isopropyl group, an n-butyl group, an isobutyl group, a tert-butyl group, an n-amyl group, an isoamyl group, an n-hexyl group, an isohexyl group, a cyclopentyl group, and a cyclohexyl group. These $X^1$ and $X^2$ may be the same or different. a and b each indicate the number of the substituents $X^1$ and $X^2$, and is an integer of from 0 to 4. Where the polymer has plural $X^1$'s, said plural $X^1$'s may be the same or different; and where it has plural $X^2$'s, said plural $X^2$'s may be the same or different.

Y represents a single bond, an alkylene group having from 1 to 8 carbon atoms (e.g., methylene, ethylene, propylene, butylene, pentylene, hexylene, etc.), an alkylidene group having from 2 to 8 carbon atoms (e.g., ethylidene, isopropylidene, etc.), a cycloalkylene group having from 5 to 15 carbon atoms (e.g., cyclopentylene, cyclohexylene, etc.), a cycloalkylidene group having from 5 to 15 carbon atoms (e.g., cyclopentylidene, cyclohexylidene, etc.), —S—, —SO—, —SO2—, —O—, —CO—, or a bond of a formula (II-1) or (II-2):

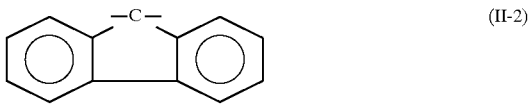

The above-mentioned polymers can be produced with ease, generally by reacting a diphenol of a general formula (III):

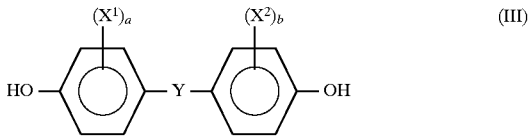

wherein $X^1$, $X^2$, a, b and Y have the same meanings as above, with a carbonate precursor such as phosgene or a carbonate compound.

Briefly, a diphenol is reacted with a carbonate precursor such as phosgene in a solvent such as methylene chloride in the presence of a known acid receptor or a molecular weight regulator; or a diphenol is interesterified with a carbonate precursor such as a carbonate compound in the presence or absence of a solvent.

The diphenol of formula (III) includes various diphenols. Especially preferred is 2,2-bis(4-hydroxyphenyl)propane [bisphenol A]. As other diphenols except bisphenol A, for example, mentioned are bis(4-hydroxyphenyl)alkanes such as bis (4-hydroxyphenyl)methane, 1, 1-bis (4-hydroxyphenyl) ethane, 1,2-bis(4-hydroxyphenyl)ethane; bis(4-hydroxyphenyl)cycloalkanes such as 1,1-bis(4-hydroxyphenyl)cyclohexane, 1,1-bis(4-hydroxyphenyl) cyclodecane; and also 4,4'-dihydroxydiphenyl, bis(4-hydroxyphenyl) oxide, bis(4-hydroxyphenyl) sulfide, bis (4-hydroxyphenyl) sulfone, bis (4-hydroxyphenyl) sulfoxide, bis (4-hydroxyphenyl) ether, bis (4-hydroxyphenyl) ketone, etc. In addition to these, also mentioned is hydroquinone. These diphenols may be used singly or as combined.

The carbonate includes, for example, diaryl carbonates such as diphenyl carbonate; and dialkyl carbonates such as dimethyl carbonate, diethyl carbonate.

To produce polycarbonates through the reaction of a diphenol and a carbonate precursor, a molecular weight regulators can be used, if desired. The molecular weight regulator is not specifically defined, and may be any and every one generally used in production of ordinary polycarbonates. For example, usable are monophenols such as phenol, p-cresol, p-tert-butylphenol, p-tert-octylphenol, p-cumylphenol, and nonylphenol.

The polycarbonate resins for the component (A) may be either homopolymers comprising one type of diphenols, or copolymers comprising two or more types of diphenols. They may also be thermoplastic, random-branched polycarbonate resins comprising polyfunctional aromatic compounds along with monophenols.

The polycarbonate resins may also be polycarbonate-polyorganosiloxane copolymers comprising organosiloxane blocks having a degree of number-average polymerization of 5 or more.

They may also be mixtures comprising two or more different polycarbonate resins.

The polycarbonate resins for the component (A) in the composition of the present invention are preferably those having a viscosity-average molecular weight of from 13,000 to 30,000, more preferably from 15,000 to 25,000, from the viewpoint of their mechanical strength, especially their Izod impact strength and moldability.

As polycarbonate resins with such characteristics, for example, referred to are aromatic polycarbonate resins that are commercially available as Toughlon FN3000A, FN2500A, FN2200A, FN1900A and FN1500A (all trade names of commercial products of Idemitsu Petrochemical Co.).

The titanium powder which is in the resin composition of the present invention as the component (B) is to lower the transparency of the polycarbonate resins of the component (A), which resins intrinsically have low reflectance and high transparency, and to increase the cloudiness of said polycarbonate resins, thereby making the resins have high reflectance and improving the flame retardancy of the resins.

Since the component (B), titanium oxide is to lower the transparency of the polycarbonate resins of the component (A) while increasing the reflectance of said resins, as mentioned hereinabove, it is used in the form of fine powder in the present invention. Such powdery titanium oxide may comprise various fine particles different in size and can be prepared by any of the chloride method and the sulfate method.

The titanium oxide for use in the present invention may be either a rutile-type one or an anatase-type one; but preferred is the former, rutile-type titanium oxide from the viewpoint of its heat stability and weather resistance. The shape of the fine particles constituting it is not specifically defined, and the particles maybe any of flaky, spherical and amorphous ones.

The titanium oxide to be used as the component (B) in the present invention is preferably surface-treated with, for example, hydrated oxides of aluminium and/or silicon, or amine compounds or polyol compounds. For producing uniform compositions, the surface treatment is especially preferred, as improving the uniform dispersibility of titanium oxide particles in the polycarbonate resin composition of the invention, and also the stability of the dispersion of the particles in the composition, while further improving the affinity of the titanium oxide particles for the flame retardant of the component (D) which will be referred to hereinunder.

As examples of hydrated oxides of aluminium and silicon, amine compounds and polyols compounds usable for that purpose, referred to are alumina hydrate, silica hydrate, triethanolamine and trimethylolethane.

The surface treatment itself is not specifically defined, but may be effected in any desired manner. The amount of the surface-treating agent to be adhered to the surfaces of the titanium oxide particles through this treatment is not specifically defined. However, in consideration of the light reflectance of titanium oxide and the moldability of the polycarbonate resin composition comprising the oxide, said amount may be generally from 1 to 15% by weight relative to titanium oxide to be treated.

The particle size of the titanium oxide powder to be in the composition of the invention as the component (B) is not specifically defined. However, in order to efficiently realize the above-mentioned effects, the powder is preferably one having a mean particle size of from 0.1 to 0.5 um or so.

In the composition of the first aspect of the present invention, the ratio by weight of the component (A), polycarbonate resin to the component (B), titanium oxide powder shall fall between 70/30 and 90/10. If the titanium oxide powder is smaller than the defined range, the light shieldability of the composition is poor and flame retardancy of the composition could not be improved satisfactorily. However, if it is larger than the defined range, the moldability of the composition is poor, resulting in that the molded articles will have many silver marks. From the viewpoint of the light shieldability, the flame retardancy and the moldability of the composition, the ratio by weight of the component (A) to the component (B) is preferably between 70/30 and 85/15.

In the first aspect of the present invention, the composition contains a stilbene-bisbenzoxazole derivative as the component (C). This component (C) acts as a lightness improver to increase the light reflectance of the polycarbonate resin composition without interfering with the light fastness and heat resistance of the composition.

As examples of the stilbene-bisbenzoxazole derivative, mentioned are 4-(benzoxazol-2-yl)-4'-(5-methylbenzoxazol-2-yl)stilbene of a formula (IV):

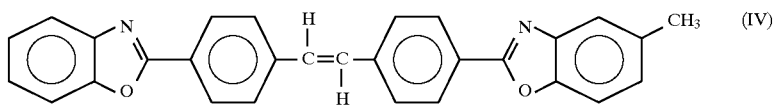

and 4,4'-bis(benzoxazol-2-yl)stilbene of a formula (V):

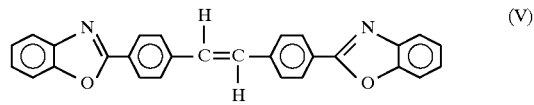

The compound of formula (IV) is commercially available, for example, as Hostalux KS (trade name of Hoechst Co.); while the compound of formula (V) is commercially available, for example, as Eastobrite OB-1 (trade name of Eastman Chemical Co.).

In the first aspect of the present invention, the composition may comprise one or more such stilbene-bisbenzoxazole derivatives as the component (C). In addition, the composition may further contain a suitable amount of at least one pigment selected from blue and violet pigments.

A mixture comprising a stilbene-bisbenzoxazole derivative and a blue or violet pigment is commercially available, for example, as Hostalux KS-N (trade name of Hoechst Co.) and Eastobrite OB-3 (trade name of Eastman Chemical Co.).

In the composition of the first aspect of the present invention, the amount of the component (C), stilbene-bisbenzoxazole derivative shall be from 1 to 1000 ppm by weight relative to the total weight of the component (A), polycarbonate resin, and the component (B), titanium oxide powder. If the amount of the component (C) is smaller than 1 ppm by weight, the light reflectance of the composition could not be improved satisfactorily. However, even if it is larger than 1000 ppm by weight, such is not so much effective in improving the light reflectance of the composition but would be rather uneconomical. From the viewpoint of the improvement in the light reflectance of the composition and from the economical aspect, the amount of the component (C) is preferably between 10 and 500 ppm by weight relative to the total weight of the component (A) and the component (B).

In the first aspect of the present invention, the composition may optionally contain a non-halogen phosphate compound as the component (D) in order to have much improved flame retardancy. The non-halogen phosphate compound enhances the activity of the component (B), titanium oxide powder thereby attaining a synergistic effect to make the composition have much improved flame retardancy, while acting to improve the stability in thermal molding of the polycarbonate resin composition.

Since the component (D), non-halogen phosphate compound does not have any halogen atoms such as bromine, wastes of the articles comprising the compound hardly pollute the environment.

As examples of such non-halogen phosphate compounds, mentioned are monophosphates and polyphosphates of a general formula (VI):

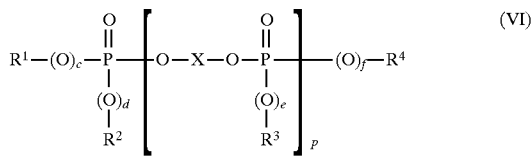

In formula (VI), $R^1$ to $R^4$ each represent an optionally-substituted aryl group, and these may be the same or different. X represents an optionally-substituted arylene group; c, d, e and f each represent 0 or 1; and p represents a number of from 0 to 5. Where a mixture of two or more of these phosphates is used, the number p is represented as a mean value to be derived from p in each phosphate. As the substituents for the aryl group and the arylene group, for example, mentioned are an alkyl group having from 1 to 10 carbon atoms, an alkoxy group having from 1 to 10 carbon atoms, and an aryl group such as a phenyl group and a tolyl group. The aryl group and the arylene group may have one or more of such substituents.

Examples of non-halogen phosphate compounds of formula (VI) include monophosphates such as triphenyl phosphate, tricresyl phosphate, trixylenyl phosphate, tribiphenyl phosphate; and polyphosphates such as phenyl-resorcinol polyphosphate, phenyl-hydroquinone polyphosphate, phenyl-cresyl-resorcinol polyphosphate, phenyl-cresylhydroquinone polyphosphate, tetraphenyl-resorcinol diphosphate, tetraphenyl-hydroquinone diphosphate, phenyl-tricresyl-resorcinol diphosphate, phenyl-tricresyl-hydroquinone diphosphate, tetrabiphenyl-resorcinol diphosphate, tetrabiphenyl-hydroquinone diphosphate. Of these, preferred are polyphosphates, since the polycarbonate resin composition comprising them do neither adhere to nor soil molds during its thermal molding. These monophosphates and polyphosphates may be in the composition either singly or as combined.

In the first aspect of the present invention, the composition may contain the optional component (D), non-halogen phosphate compound in an amount of from 0.05 to 1.00% by weight in terms of phosphorus element, relative to the total weight of the component (A), polycarbonate resin, and the component (B), titanium oxide powder. If the phosphorus element content is smaller than 0.05% by weight, the component (D) could not satisfactorily exhibit its effect to improve the flame retardancy of the composition and to attain the synergistic effect for titanium oxide. However, even if it is larger than 1.00% by weight, such is not so much effective in attaining said effect but would be rather uneconomical. Further, such a large amount of the component (D) would often lower the heat resistance of molded articles of the composition. From the viewpoint of the improvement in the flame retardancy of the composition and the heat resistance of molded articles of the composition and from the economical aspect, the phosphorus content is preferably between 0.1 and 0.5% by weight relative to the total weight of the component (A) and the component (B).

In the first aspect of the present invention, the composition may further contain, if desired, an alkoxy group-having organopolysiloxane (hereinafter referred to as organopolysiloxane) as the component (E), in order to improve its thermal moldability and especially to improve the characteristics of the component (B), titanium oxide which often worsens the surface smoothness of molded articles of the composition.

Various organopolysiloxanes are used for that purpose. As examples, referred to are linear, cyclic, network-structured, and partially branched linear organopolysiloxanes having an organoxy-silyl group of which the alkoxy moiety is bonded to the silicon atom directly or via a divalent hydrocarbon group. Especially preferred are linear organopolysiloxanes.

As examples of such organopolysiloxanes having an organoxy-silyl group of which the alkoxy moiety is bonded to the silicon atom directly or via a divalent hydrocarbon group, mentioned are linear organopolysiloxanes of a general formula (VII):

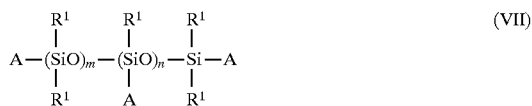

wherein $R^1$ represents a monovalent hydrocarbon group; A represents a monovalent hydrocarbon group, an alkoxy group ($-OR^4$), or an organoxy-silyl group-containing monovalent hydrocarbon group of a general formula (VIII):

in which $R^2$ represents a divalent hydrocarbon group; $R^3$ and $R^4$ each represent a monovalent hydrocarbon group; and x represents an integer of from 0 to 2; provided that at least one A in one molecule is the alkoxy group or the organoxy-silyl group-containing monovalent hydrocarbon group;

m represents an integer of from 1 to 300; n represents an integer of from 0 to 300; and (m+n) is an integer of from 1 to 300.

In formula (VII), the monovalent hydrocarbon group of $R^1$ may include, for example, an alkyl group such as methyl, ethyl, propyl, butyl, pentyl, hexyl; an alkenyl group such as vinyl, allyl, butenyl, pentenyl, hexenyl; an aryl group such as phenyl, tolyl, xylyl; and an aralkyl group such as benzyl, phenethyl. As examples of the monovalent hydrocarbon group of A, referred to are those of $R^1$ mentioned above.

In formula (VIII), the divalent hydrocarbon group of $R^2$ may be, for example, an alkylene group such as methylene, ethylene, propylene, butylene. As examples of the monovalent hydrocarbon group of $R^3$ and $R^4$, referred to are those mentioned hereinabove. The organoxy-silyl group-containing monovalent hydrocarbon group may include, for example, a trimethoxysilylethylene group, a triethoxysilylethylene group, a dimethoxyphenoxysilylpropylene group, a trimethoxysilylpropylene group, a trimethoxysilylbutylene group, a methyldimethoxysilylpropylene group, and a dimethylmethoxysilylpropylene group.

For the component (E), one or more such organopolysiloxanes may be used either singly or as combined.

In the composition of the first aspect of the present invention, the amount of the optional component (E), organopolysiloxane is not specifically defined, but may be advantageously from 0.01 to 5% by weight relative to the total weight of the component (A), polycarbonate resin, and the component (B), titanium oxide powder. If its amount is smaller than 0.01% by weight, the component (E) could not satisfactorily exhibit its effect to improve the characteristics of titanium oxide. However, even if it is larger than 5 % by weight, such is not so much effective in attaining said effect but would be rather uneconomical. Further, such a large amount of the component (E) would often worsen the mechanical properties such as the impact-resistant strength of molded articles of the composition.

The composition of the first aspect of the present invention may still further contain, if desired, a fibril-forming polytetrafluoroethylene as the component (F), when the composition is desired to have much higher flame retardancy. Said component (F) is a dripping inhibitor, which acts to inhibit flaming resins from dripping down.

The fibril-forming ability as referred to herein for said polytetrafluoroethylene is meant to form fibrils when the composition comprising the polymer has undergone shearing stress for plasticization while being kneaded or injection-molded.

The fibril-formingpolytetrafluoroethylene (PTFE) of that type can be obtained, for example, by polymerizing tetrafluoroethylene in an aqueous medium in the presence of sodium, potassium or ammonium hydroxydisulfide, under a pressure of from 1 to 100 psi or so, and at a temperature of from 0° to 200° C. or so, preferably from 20° to 100° C.

The type of the fibril-forming PTFE for use in the present invention is not specifically defined. For example, preferably used is one belonging to Type 3 as classified according to ASTM Standard. Commercially-available products of Type 3 are usable, which are, for example, Teflon 6-J (trade name of Mitsui-Dupont Fluorochemical Co.), and Polyflon TFE D-1 and Polyflon TFEF-104 (both trade names of Daikin Industry Co.). Apart from those of Type 3, also employable are Argoflon F5 (trade name of Montefluos Co.), Polyflon MPA FA-100 and Polyflon TFE F201 (both trade names of Daikin Industry Co.).

For the component (F), one or more such fibril-forming polytetrafluoroethylenes may be used either singly or as combined.

In the composition of the first aspect of the present invention, the amount of the optional component (F), fibril-forming polytetrafluoroethylene is not specifically defined, but may be advantageously from 0.01 to 1% by weight relative to the total weight of the component (A), polycarbonate resin, and the component (B), titanium oxide powder. If its amount is smaller than 0.01% by weight, the component (F) could not satisfactorily exhibit its dripping inhibiting effect. However, even if it is larger than 1% by weight, such is not so much effective in attaining said effect but would be rather uneconomical.

Now, the second aspect of the present invention is described in detail hereinunder.

The component (A), polycarbonate resin and the component (B), titanium oxide to be in the composition of the second aspect may be the same as those to be in the composition of the first aspect mentioned hereinabove.

In the second aspect, the amount of the component (B), titanium oxide shall be from 0.1 to 30% by weight of the total of the component (A), polycarbonate resin and the component (B) of being 100% by weight. Accordingly, the amount of the component (A), polycarbonate resin shall be from 70 to 99.9% by weight. Preferably, the amount of the component (B), titanium oxide may be from 1 to 25% by weight. If the amount of titanium oxide is smaller than 0.1% by weight, the light transmittance of the composition will increase, resulting in that the composition could not have high reflectance. If so, in addition, the component (B), titanium oxide could not exhibit the intended synergistic effect with the flame retardant, non-halogen phosphate compound to be in the composition as the component (D) to further improve the flame-retarding effect of said phosphate compound. On the contrary, if the amount of the component (B), titanium oxide is larger than 30% by weight, such often interferes with the heat stability of the composition that shall consist essentially of the component (A), polycarbonate resin, during thermal molding, thereby worsening the outward appearance of the resulting molded articles. Therefore, the composition must not contain such a large amount of the component (B), titanium oxide. If the amount of the component (B), titanium oxide is lower than 1% by weight or higher than 25% by weight within the defined range between 0.1 and 30% by weight, such does not have any substantial influence on the reflectance of the composition and on the heat stability thereof during molding but would often lower these characteristics of the composition.

The component (D), non-halogen phosphate compound to be in the composition of the second aspect of the invention may be the same as in the first aspect. The component (D), non-halogen phosphate compound is added to the polycarbonate resin composition in order to make the composition resistant to flames, while unexpectedly exhibiting a synergistic effect with the component (B), surface-treated titanium oxide to thereby improve the heat stability of the polycarbonate resin composition during thermal molding.

The amount of the component (D), non-halogen phosphate compound to be in the composition shall be from 0.05 to 1.00 part by weight in terms of phosphorus element in said compound, relative to the sum of the components (A) and (B) of being 100 parts by weight, but may be preferably from 0.1 to 0.5 parts by weight. If its amount is smaller than 0.05 parts by weight in terms of phosphorus element, the compound could exhibit neither the flame-retarding effect nor the synergistic effect with titanium oxide. However, even if the amount is larger than 1.00 part by weight, such is not so much effective in attaining said effects but is rather unfavorable since the heat resistance of molded articles of the composition is often lowered. Even within the range between 0.05 and 1.00 part by weight, if its amount is smaller than 0.1 parts by weight, the phosphate compound could not exhibit its effects fully satisfactorily, but if larger than 0.5 parts by weight, the increase in its effects begins to lower in some degree.

The component (D), non-halogen phosphate compound is a phosphate not containing halogens such as bromine. Comprising the phosphate of that type, the composition is intended to be free from the possibility of environmental destruction due to wastes of molded articles of the composition. The phosphate maybe in any form of monomers or oligomers. However, preferred are phosphate oligomers, since the polycarbonate resin composition comprising them do neither adhere to nor soil molds during its thermal molding.

The polycarbonate resin composition of the second aspect of the present invention comprises the above-mentioned components (A), (B) and (D), and may optionally contain an alkoxy group-having organopolysiloxane (hereinafter referred to as organopolysiloxane) as the component (E), in order to improve its thermal moldability and especially to improve the characteristics of the component (B), titanium oxide which often worsens the surface smoothness of molded articles of the composition. The organopolysiloxane of the component (E) may be the same as in the composition of the first aspect. The amount of the component (E) to be in the composition of the second aspect is not specifically defined, but may be preferably from 0.01 to 2 parts by weight relative to 100 parts by weight of the sum of the components (A) and (B). If its amount is smaller than 0.01 parts by weight, the organopolysiloxane could not exhibit its intrinsic effects such as those mentioned above. However, if the organopolysiloxane is added to the composition in an amount larger than 2 parts by weight, it will unfavorably lower the impact strength of molded articles of the composition while worsening other mechanical characteristics of the articles.

As mentioned hereinabove, the polycarbonate resin composition of the second aspect of the present invention comprises the above-mentioned components (A), (B) and (D) and optionally contains the above-mentioned component (E). If further desired, the polycarbonate resin composition may additionally contain a fibril-forming polytetrafluoroethylene as the component (F) acting as a dripping inhibitor, along with or separately from the component (E), when the composition is desired to have much more improved flame retardancy. The component (F) may be the same as in the composition of the first aspect. Though not specifically defined, the amount of the component (F) to be added is preferably from 0.01 to 1 part by weight relative to 100 parts by weight of the sum of the components (A) and (B). Even if the component (F) is added in an amount larger than 1 part by weight, its effect could no more be augmented than the intended one.

The flame-retardant polycarbonate resin compositions of the first and second aspects of the present invention may optionally contain any other various additives, such as antioxidants, lubricants (mold-releasing agents) and other inorganic fillers, so far as said additives do not interfere with the objects of the present invention.

The flame-retardant polycarbonate resin compositions of the first and second aspects of the present invention can be produced, for example, by mixing and kneading the essential components and optional components such as those mentioned hereinabove, optionally along with various additive. To mix and knead them, employable are any ordinary means of producing ordinary resin compositions. For these, for example, preferably used are ribbon blenders, Henschel mixers, Bumbury mixers, drum tumblers, single-screw or multi-screw extruders, and co-kneaders. Though not specifically defined, the kneading temperature may be generally from 240° to 340° C.

The resin compositions thus produced are molded into flat sheets or curved sheets through ordinary molding means of, for example, injection molding or compression molding, to obtain light reflectors of the present invention. The light reflectors are favorably used, for example, in lighting devices or for liquid crystal display backlight. Especially favorably, these are used for liquid crystal display backlight.

As containing no bromine compounds, the light reflectors of the present invention have excellent light fastness. Therefore, even though used for a long period of time, they still maintain their good characteristics and their reflectance is lowered little. Thus, the light reflectors of the present invention are far superior to conventional ones.

Now, the present invention is described in more detail by means of the following examples, which, however, are not intended to restrict the scope of the invention.

The materials used in Examples 1 to 4 and Comparative Examples 1 to 4 are as follows:

(A) Polycarbonate (Polycarbonate Resin):
  Toughlon FN1900A (trade name of Idemitsu Petrochemical Co.; bisphenol A-type polycarbonate having a viscosity-average molecular weight of 19,500)—this is referred to as 1900A.

(B) Titanium Oxide Powder:
  TIPAQUE CR63 (trade name of Ishihara Sangyo KK)—this is referred to as CR63.

(C) Lightness Improver:
  Hostalux KS-N (tradename of Hoechst Co.)—this is referred to as KS-N.

(D) Non-halogen Phosphate:
  Adekastab PFR (trade name of Asahi-Denka Kogyo KK; phenyl-resorcinol polyphosphate having a phosphorus content of 10.8% by weight)—this is referred to as PFR.

(E) Organopolysiloxane:
  Methoxy-modified Silicone BY16-160 (trade name of Dow Corning Toray Silicone Co.)—this is referred to as Silicone BY16-160.

(F) Fibril-forming Polytetrafluoroethylene:
  PTFE FA-100 (trade name of Daikin Industry Co.)—this is referred to as Teflon FA-1000.

The materials used in Examples 5 to 9 and Comparative Examples 5 to 9 are as follows:

(A) Polycarbonate (Polycarbonate Resin):
  Toughlon FN1900A (trade name of Idemitsu Petrochemical Co.; polycarbonate resin comprising bisphenol A-type homopolymer and having a viscosity-average molecular weight of 19,500)—this is referred to as A1900.

(B) Titanium Oxide:
  TIPAQUE CR60 (trade name of Ishihara Sangyo KK)—this is referred to as titanium oxide (a).
  TIPAQUE CR63 (trade name of Ishihara Sangyo KK)—this is referred to as titanium oxide (b).

(C) Non-halogen Phosphate:
  Phenyl-Resorcinol Phosphate PFR (trade name of Asahi-Denka KK, having a phosphorus content of 10.8% by weight)
  this is referred to phosphate (a).
  Triphenyl Phosphate TPP (trade name of Dai-hachi Chemical Co., having a phosphorus content of 9.8% by weight)—this is referred to as phosphate (b).

(D) Organopolysiloxane:
  Methoxy-modified Silicone BY16-160 (produced by Dow Corning Toray Silicone Co.)—this is referred to as Silicone.

(E) Fibril-forming Polytetrafluoroethylene:
  Fibril-forming PTFE FA-100 (produced by Daikin Industry Co.)—this is referred to as PTFE.

(F) TBA Oligomer BC-52 (produced by Great Lakes Chemical Co.) —this is referred to as TBA-G.

The properties of the polycarbonate resin samples prepared hereinunder were measured and evaluated according to the methods mentioned below.

(a) Reflectance:

A square disc sample of 3.2×2.5×0.1 cm was prepared through molding at 280° C. Using an LCM spectrophotometer, MS2020 Plus (produced by Macbeth Co.), the Y value of the sample was measured.

(b) Flame Retardancy UL94:

Samples having a thickness of 3 mm or 1.5 mm were subjected to a vertical fire test according to UL94.

(c) Transmittance:

Using SZ Sigma 90 (produced by Nippon Denshoku Kogyo KK), the transmittance of each sample was measured according to JIS K7105.

(d) Light Fastness:

Using a xenon arc lamp (produced by Atlas Electric Co.; Ci 65; 6.5 kW), ΔE of each sample was measured on a black panel at 63° C. in no rain for 600 hours, from which the light fastness of the sample was evaluated.

(e) In-mold Thermal Stability:

Using a molding machine (IS-25E Model; produced by Toshiba Co.), the in-mold thermal stability of each sample was measured at a settled temperature of 300° C. for a residence time of 20 minutes. The results are represented by the following:

S: Silver marks formed.

O: No change.

(f) Oxygen Index (LOI):

This was measured according to JIS-K-7205.

(g) Bending Temperature under Load:

This was measured according to ASTM D648 under a load of 1.8 MPa. Examples 1 to 9, and Comparative Examples 1 to 9:

As in Table 1, Table 2 and Table 1- (1) showing constitutive components and their amounts, resin compositions were prepared by melt-kneading, extruding and pelletizing the components through a 50 mm φ-single screw extruder at a cylinder temperature of 280° C. and a screw revolution of 100 rpm. The resulting pellets were dried at 120° C. for 5 hours, and then cast-molded to prepare test pieces, of which the physical properties were measured.

The data of the physical properties of the resin compositions measured are shown in Table 1, Table 2 and Table 1-(2).

TABLE 1

| | | Example | | | |
|---|---|---|---|---|---|
| | | 1 | 2 | 3 | 4 |
| Amount (wt. pts.) | (A) polycarbonate resin [1900A] | 85 | 80 | 70 | 85 |
| | (B) Titanium oxide powder [CR63] | 15 | 20 | 30 | 15 |
| | (C) Lightness improver [KS-N] | 0.01 | 0.01 | 0.01 | 0.01 |
| | (D) Phosphate [PFR] | 2 | 2 | 2 | — |
| | (E) Silicone BY16-160 | — | 1 | 1 | — |
| | (F) Teflon FA-100 | — | 0.5 | — | — |
| Physical Data | Reflectance (Y value) | 97.0 | 97.5 | 97.5 | 97.0 |
| | UL94 | | | | |
| | 3.0 mm | V-0 | — | V-0 | V-2 |
| | 1.5 mm | V-0 | — | — | — |
| | Transmittance (%) | 0.3 | 0.1 | 0.02 | 0.3 |
| | Light fastness (ΔE) | 0.7 | 0.5 | 0.6 | 0.7 |
| | In-mold thermal stability | O | O | O | O |

TABLE 2

| | | Comparative Example | | | |
|---|---|---|---|---|---|
| | | 1 | 2 | 3 | 4 |
| Amount (wt. pts.) | (A) polycarbonate resin [1900A] | 90 | 50 | 92 | 60 |
| | (B) Titanium oxide powder [CR63] | 10 | 50 | 8 | 40 |
| | (C) Lightness improver [KS-N] | — | — | 0.01 | 0.04 |
| | (D) Phosphate [PFR] | — | 2 | 2 | 2 |
| | (E) Silicone BY16-160 | — | 5 | — | 2 |
| | (F) Teflon FA-100 | — | 0.5 | 0.5 | 0.5 |
| Physical Data | Reflectance (Y value) | 95.0 | 96.0 | 97.0 | 97.5 |
| | UL94 | | | | |
| | 3.9 mm | V-2 | — | — | — |
| | 1.5 mm | — | V-0 | V-0 | V-0 |
| | Transmittance (%) | 0.8 | 0.01> | 1.3 | 0.01> |
| | Light fastness (ΔE) | 0.6 | 0.5 | 0.7 | 0.6 |
| | In-mold thermal stability | O | S | S | S |

TABLE 1-(1)

| | Components | | | | | | |
|---|---|---|---|---|---|---|---|
| | Titanium Oxide | | | Phosphate | | | |
| | A1900 | (a) | (b) | (a) | (b) | Silicone | PTFE | TBA-G |
| Example 5 | 90 | 10 | | 2 (0.21) | | | | |
| 6 | 90 | 10 | | 2 (0.21) | | | 0.5 | |
| 7 | 75 | | 25 | | 5 (0.45) | 0.5 | | |
| 8 | 75 | | 25 | | 5 (0.45) | 0.5 | 0.3 | |
| 9 | 98 | | 2 | 2 (0.21) | | | | |
| Compara. Example 5 | 90 | 10 | | | | | | |
| 6 | 100 | | | 2 (0.21) | | | | |
| 7 | 65 | | 35 | | 5 (0.45) | 0.5 | 0.3 | |
| 8 | 90 | | 10 | 11 (1.07) | | | 0.3 | |
| 9 | 90 | | 10 | | | | 0.5 | 10 |

For the amounts of the components, polycarbonate and titanium oxide were in terms of % by weight, while the other components were in terms of parts by weight relative to 100 parts by weight of the sum of polycarbonate and titanium oxide. The parenthesized data for phosphate indicate the data in terms of phosphorus element (parts by weight).

TABLE 1-(2)

| | Data Measured | | | | | |
|---|---|---|---|---|---|---|
| | Reflectance | UL94 | | Oxygen | In-mold Thermal | Light Fastness | Bending Temperature under Load |
| | Y value | 3 mm | 1.5 mm | Index | Stability | (ΔE) | (°C.) |
| Example 5 | 94.5 | V-0 | — | 33 | O | 0.8 | 119 |
| 6 | 94.3 | — | V-0 | 33 | O | 0.7 | 119 |
| 7 | 96.5 | V-0 | — | 38 | O | 0.8 | 105 |
| 8 | 96.4 | — | V-0 | 38.5 | O | 0.8 | 105 |
| 9 | — | V-0 | — | 32.5 | O | — | 120 |
| Compara. Example 5 | 92.0 | V-2 | — | 27 | S, Y | 0.7 | 130 |
| 6 | — | V-2 | — | 28 | O | — | 119 |
| 7 | 96.8 | — | V-0 | 38 | S | 0.6 | 100 |
| 8 | 94.8 | — | V-0 | 40 | O | 1.0 | 83 |
| 9 | 94.0 | — | V-0 | 32 | S, Y | 3.5 | 129 |

As is known from Table 1 and Table 2, the samples of Examples 1 to 3, all comprising the lightness improver and the phosphate, had high reflectance and high flame retardancy (UL94: V-0). With the increase in the titanium oxide content, the samples had lowered transmittance, or that is, increased light shieldability.

For the sample of Example 4 containing the lightness improver but no phosphate, its flame retardancy was V-2 as UL94, but its reflectance was 97.0 and was high.

As opposed to these, the sample of Comparative Example 1 containing no lightness improver had low reflectance. For the sample of Comparative Example 2 containing too much titanium oxide but no lightness improver, its reflectance was low and had silver marks. For the sample of Comparative Example 3 having a too small titanium oxide content, its transmittance was 1.3% and was high. If this is used as a light reflector, it transmits light and its light shieldability is poor. For the sample of Comparative Example 4 containing both the lightness improver and the phosphate but having a too large titanium oxide content, this had silver marks though having high reflectance and good flame retardancy.

The samples of Examples 5 to 9 and those of Comparative Examples 5 to 9 are evaluated with reference to the data shown in Table 1-(2).

(1) The sample of Example 5 had high flame retardancy (V-0). Comparing this with the sample of Comparative Example 9, it is known that the amount of the phosphate compound to be added may be reduced while the decrease in the heat resistance causes no problem in its practical use.

(2) From the data of the sample of Example 6, it is known that PTFE is effective in further improving the flame retardancy, or that is, even if the sample was thinned, it still had good flame retardancy.

(3) The samples of Examples 7 and 8 had high flame retardancy and a high Y value.

(4) The sample of Example 9 containing both the phosphate compound and titanium oxide exhibited the synergistic effect of the two. Comparing this with the sample of Comparative Example 6, it is known that the former has a larger oxygen index than the latter.

(5) The sample of Comparative Example 5 comprised of only polycarbonate resin and titanium oxide had poor in-mold thermal stability and had silver marks.

(6) The sample of Comparative Example 6 comprised of only polycarbonate resin and the phosphate compound could not have an increased oxygen index and its flame retardancy was not improved to the level of V-0.

(7) The sample of Comparative Example 7, of which the titanium oxide content was over the defined range, had poor in-mold thermal stability and had silver marks.

(8) The sample of Comparative Example 8, of which the phosphate content was over the defined range, is problematic in its practical use, since the bending temperature under load for this is low.

(9) The sample of Comparative Example 9 containing the flame retardant, bromine-containing TBA oligomer had poor in-mold thermal stability and had poor light fastness.

Having been demonstrated hereinabove, the flame-retardant polycarbonate resin compositions of the present invention have increased reflectance and improved light shieldability, light fastness and moldability while still having good mechanical properties such as flame retardancy and impact resistance, and are favorably used as materials for light reflectors.

As containing no bromine, the light reflectors of the present invention produced by molding these resin compositions have excellent light fastness, and their reflectance is lowered little even when used for a long period of time. Therefore, the light reflectors are favorably used, for example, in lighting devices or for liquid crystal display backlight.

While the invention has been described in detail and with reference to specific embodiments thereof, it will be apparent to one skilled in the art that various changes and modifications can be made therein without departing from the spirit and scope thereof.

What is claimed is:

1. A flame retardant polycarbonate resin composition comprising (A) a polycarbonate resin and (B) a titanium oxide powder in a ratio by weight of from 70/30 to 90/10, and containing (C) a compound containing the stilbene-bisbenzoxazole group, which compound functions to increase the light reflectance of the polycarbonate resin composition, in an amount of from 1 to 1000 ppm by weight relative to the total weight of the component (A) and the component (B).

2. A flame-retardant polycarbonate resin composition comprising (A) a polycarbonate resin and (B) a titanium oxide powder in a ratio by weight of from 70/30 to 90/10, and containing (C) a compound containing the stilbene-bisbenzoxazole group, which compound functions to increase the light reflectance of the polycarbonate resin composition in an amount of from 1 to 1000 ppm by weight and (D) a non-halogen phosphate compound in an amount of from 0.05 to 1.00% by weight in term of phosphorus element, relative to the total weight of the component (A) and the component (B), the non-halogen phosphate compound (D) having the formula

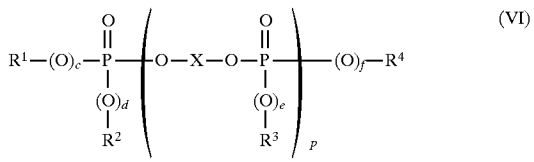

where $R^1$ to $R^4$ each represent an optionally-substituted aryl group, and these may be the same or different, X represents an optionally-substituted arylene group, c, d, e and f each represent 0 or 1 and p represents a number of from 0 to 5, and when a mixture of two or more of these phosphates is in the composition the number p represents a mean value to be derived from p in each phosphate.

3. The flame-retardant polycarbonate resin composition as claimed in claim 1 or 2, which further contains (E) an alkoxy group-having organopolysiloxane in an amount of from 0.01 to 5% by weight relative to the total weight of the component (A) and the component (B).

4. The flame-retardant polycarbonate resin composition as claimed in claim 3, in which the component (E), alkoxy group-having organopolysiloxane is an organopolysiloxane having an organoxy-silyl group as bonded to the silicon atom via a divalent hydrocarbon group.

5. The flame-retardant polycarbonate resin composition as claimed in claim 3, which further contains (F) a fibril-forming polytetrafluoroethylene in an amount of from 0.01 to 1% by weight relative to the total weight of the component (A) and the component (B).

6. A light reflector as produced by molding the flame-retardant polycarbonate resin composition of claim 1.

7. The light reflector as claimed in claim 6, which is for liquid crystal display backlight.

8. A flame-retardant polycarbonate resin composition comprising (A) from 99.9 to 70% by weight of a polycarbonate resin and (B) from 0.1 to 30% by weight of a titanium oxide powder, and containing (D) a non-halogen phosphate compound in an amount of from 0.05 to 1.00 part by weight in term of phosphorus element, relative to 100 parts by weight of the sum of the component (A) and the component (B), the non-halogen phosphate compound (D) having the formula

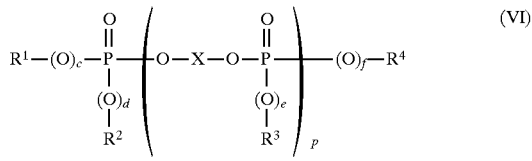

where $R^1$ to $R^4$ each represent an optionally-substituted aryl group, and these may be the same or different, X represents an optionally-substituted arylene group, c, d, e and f each represent 0 or 1, and p represents a number of from 0 to 5, and when a mixture of two or more of these phosphates is in the composition, the number p represents a mean value to be derived from p in each phosphate.

9. The flame-retardant polycarbonate resin composition as claimed in claim 8, which further contains (E) an alkoxy group-having organopolysiloxane in an amount of from 0.01 to 2 parts by weight relative to 100 parts by weight of the sum of the component (A) and the component (B).

10. The flame-retardant polycarbonate resin composition as claimed in claim 9, in which the alkoxy group-having organopolysiloxane is an organopolysiloxane having an organoxy-silyl group as bonded to the silicon atom via a divalent hydrocarbon group.

11. The flame-retardant polycarbonate resin composition as claimed in claim 9, which further contains (F) a fibril forming polytetrafluoroethylene in an amount of from 0.01 to 1 part by weight relative to 100 parts by weight of the sum of the component (A) and the component (B).

12. A light reflector as produced by molding the flame-retardant polycarbonate resin composition of claim 8.

13. A reflector for liquid crystal back light, as produced by molding the flame-retardant polycarbonate resin composition of claim 8.

14. The flame-retardant polycarbonate resin of claim 1, where the compound (C) is 4,4'-bis(benzoxazol-2-yl) stilbene or 4-(benzoxazol-2-yl)-4'-(5-methylbenzoxazol-2-yl) stilbene.

15. The flame retardant polycarbonate resin of claim 14 where the $TiO_2$ powder has a mean particle size of 0.1 to 0.5mm.

16. The flame retardant polycarbonate resin of claim 14, where the phosphate (D) is triphenyl phosphate.

17. The flame retardant polycarbonate resin of claim 15 where the phosphate (D) is triphenyl phosphate.

* * * * *